US009141896B2

(12) United States Patent
Tanabe

(10) Patent No.: US 9,141,896 B2
(45) Date of Patent: Sep. 22, 2015

(54) APPARATUS, JOB MANAGEMENT METHOD, AND STORAGE MEDIUM STORING PROGRAM FOR NOTIFYING PROCESSING RESULT OF A JOB

(71) Applicant: CANON KABUSHIKI KAISHA, Tokyo (JP)

(72) Inventor: Masaki Tanabe, Sagamihara (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/933,154

(22) Filed: Jul. 2, 2013

(65) Prior Publication Data

US 2014/0009789 A1    Jan. 9, 2014

(30) Foreign Application Priority Data

Jul. 9, 2012 (JP) ................................. 2012-154002

(51) Int. Cl.
*G06K 15/00* (2006.01)
*G06K 15/02* (2006.01)

(52) U.S. Cl.
CPC .............. *G06K 15/40* (2013.01); *G06K 15/402* (2013.01); *G06K 15/408* (2013.01); *G06K 15/1821* (2013.01)

(58) Field of Classification Search
USPC ......................................................... 358/1.15
See application file for complete search history.

(56) References Cited

U.S. PATENT DOCUMENTS

| 7,869,733 B2 * | 1/2011 | Sato ................................ 399/82 |
| 2006/0221384 A1 * | 10/2006 | Tanaka ......................... 358/1.15 |
| 2007/0033192 A1 * | 2/2007 | Sakoh et al. ..................... 707/10 |
| 2008/0316530 A1 * | 12/2008 | Kurihara ....................... 358/1.15 |
| 2011/0317207 A1 * | 12/2011 | Shimizu ....................... 358/1.15 |

FOREIGN PATENT DOCUMENTS

JP             11-112722 A      4/1999

OTHER PUBLICATIONS

Machine translation for JP 11-112722, IDS, Apr. 23, 1999.*

* cited by examiner

*Primary Examiner* — Qian Yang
(74) *Attorney, Agent, or Firm* — Rossi, Kimms & McDowell LLP

(57) ABSTRACT

If the processing result of the job which has not been notified is stored in the memory when a state of the apparatus has transited from a state incapable of communication with the job management apparatus to a state capable of communication in accordance with a user instruction, the processing result is read out from the memory and is notified to the job management apparatus.

25 Claims, 5 Drawing Sheets

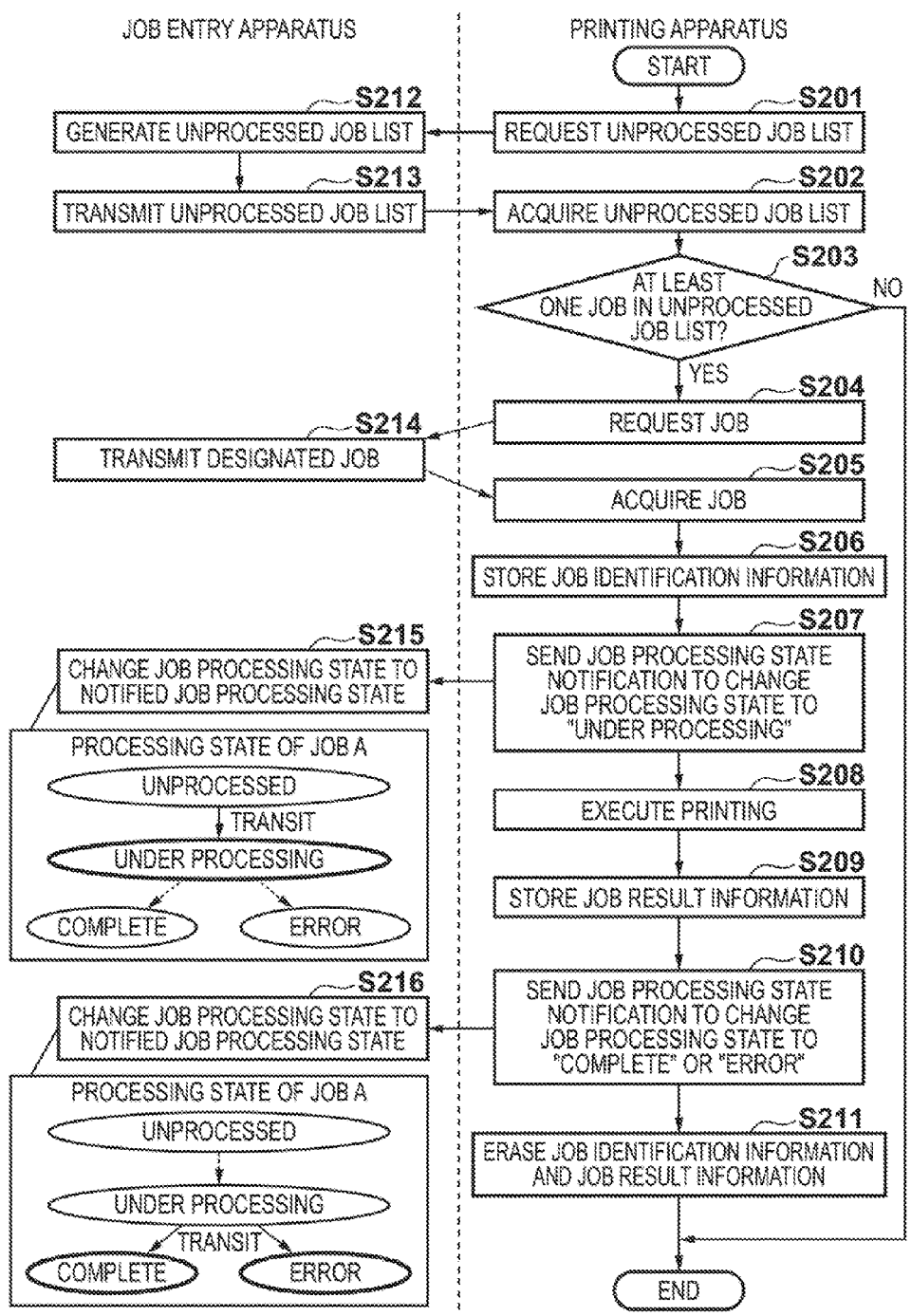

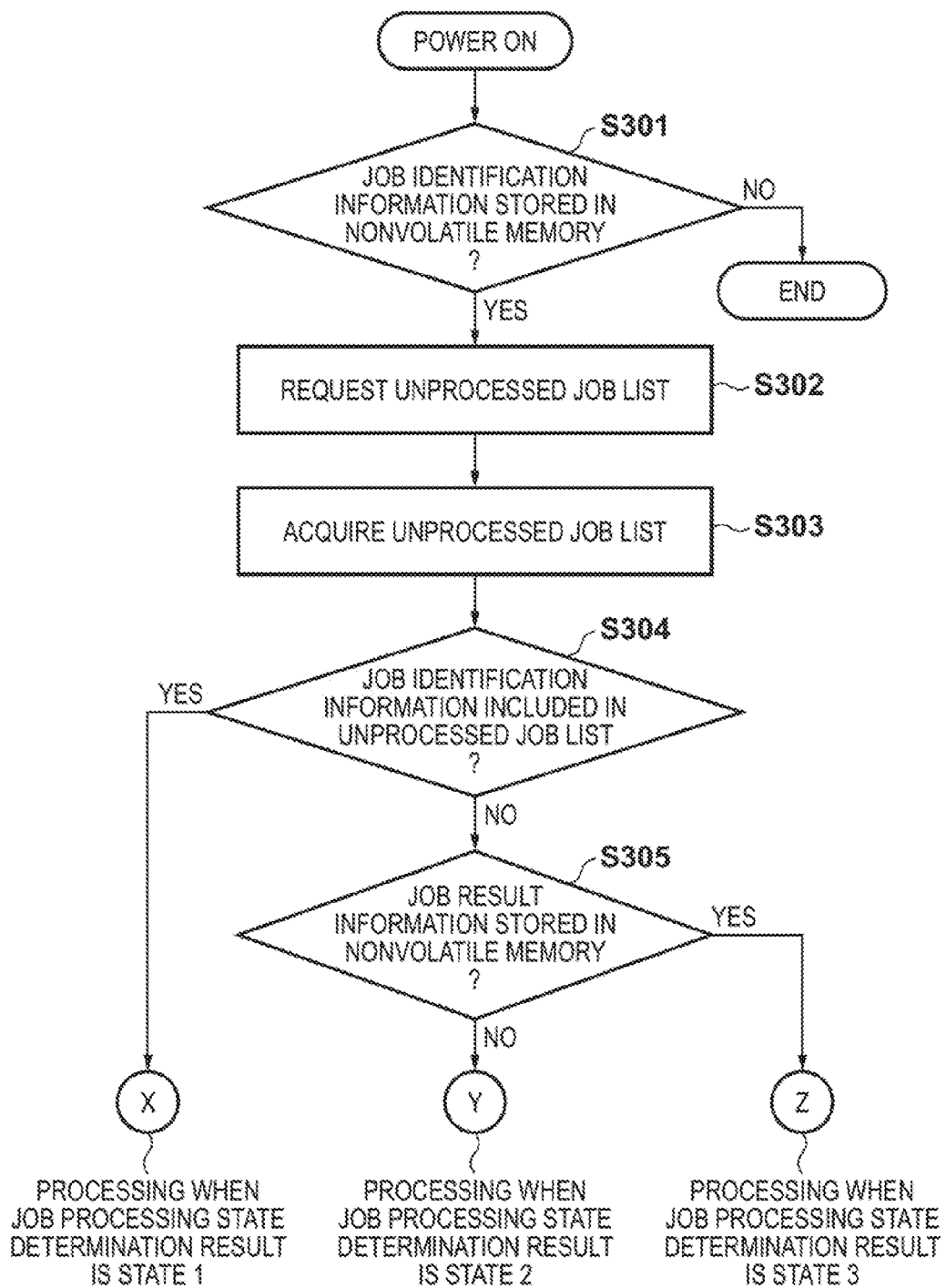

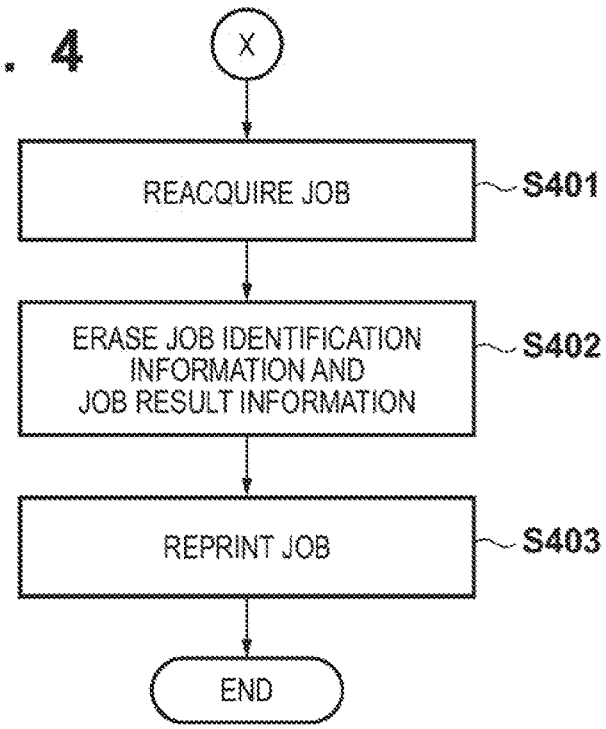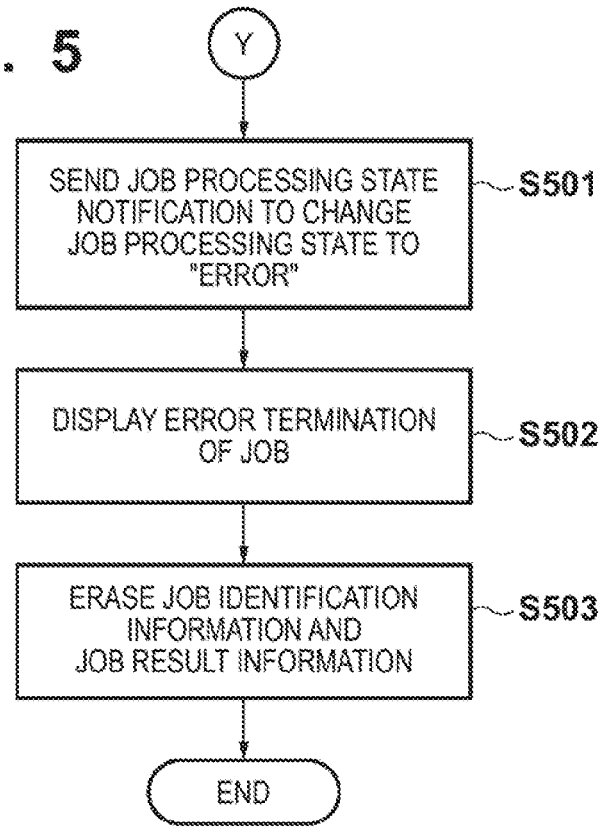

US 9,141,896 B2

APPARATUS, JOB MANAGEMENT METHOD, AND STORAGE MEDIUM STORING PROGRAM FOR NOTIFYING PROCESSING RESULT OF A JOB

BACKGROUND OF THE INVENTION

1. Field of the Invention

The present invention relates to an apparatus capable of notifying a processing result of a job, a job management method, and a storage medium storing a program.

2. Description of the Related Art

Conventionally known is a printing apparatus that executes a print job transmitted through a network or Web and notifies the transmission source or the like of the result. On the other hand, upon acquiring a print result representing the end of printing from the printing apparatus to which the print job has been offered, the transmission source can judge that the print job can be discarded. However, such a printing apparatus cannot notify a print result if the power to the printing apparatus is cut off during or after printing.

Japanese Patent Laid-Open No. 11-112722 describes a printing apparatus that records the processing state of each received print job in a nonvolatile memory and, when recovered from power shutdown, refers to the processing states of the print jobs and confirms the presence/absence of an unprocessed print job. Japanese Patent Laid-Open No. 11-112722 also describes that when an unprocessed print job exists, the transmission source of the print job is requested to resend the image data of the print job.

However, in the printing apparatus of Japanese Patent Laid-Open No. 11-112722, the processing state of a print job is recorded to execute processing of an unprocessed print job when the unprocessed print job exists. Hence, once the print job is completed, the record of the processing state can be erased. Hence, in a configuration of notifying a result after printing, as described above, if the notification has failed because of power shutdown after printing before notification of the print result, the print result notification is never performed even when the printing apparatus is powered on later.

On the other hand, the transmission source that determines whether to discard the print job or not upon receiving the processing result representing the end of printing from the printing apparatus, as described above, continuously holds the print job, although the printing by the printing apparatus has ended.

SUMMARY OF THE INVENTION

An aspect of the present invention is to eliminate the above-mentioned problems with the conventional technology. The present invention provides a job processing apparatus capable of appropriately causing a job management apparatus to manage a processing result of a job the job processing apparatus has externally received, a job management method, and a storage medium storing a program.

The present invention in its first aspect provides an apparatus comprising: a processing unit configured to process an externally received job; a storage unit configured to store a processing result of the job by the processing unit in a memory; a notification unit configured to notify a job management apparatus of the processing result of the job stored in the memory by the storage unit; and a control unit configured to, in a case where the processing result of the job which has not been notified by the notification unit is stored in the memory when a state of the apparatus has transited from a state incapable of communication with the job management apparatus to a state capable of communication in accordance with a user instruction, read out the processing result from the memory and cause the notification unit to notify the job management apparatus of the processing result.

According to the present invention, it is possible to appropriately cause a job management apparatus to manage a processing result of a job a job processing apparatus has externally received.

Further features of the present invention will become apparent from the following description of exemplary embodiments with reference to the attached drawings.

BRIEF DESCRIPTION OF THE DRAWINGS

FIG. 2 is a flowchart showing the procedure of print processing based on a print job;

FIG. 3 is a flowchart showing the procedure of processing of determining a job processing state at the time of power-on;

FIG. 4 is a flowchart showing the first job processing state management procedure;

FIG. 5 is a flowchart showing the second job processing state management procedure.

DESCRIPTION OF THE EMBODIMENTS

Figure 1:
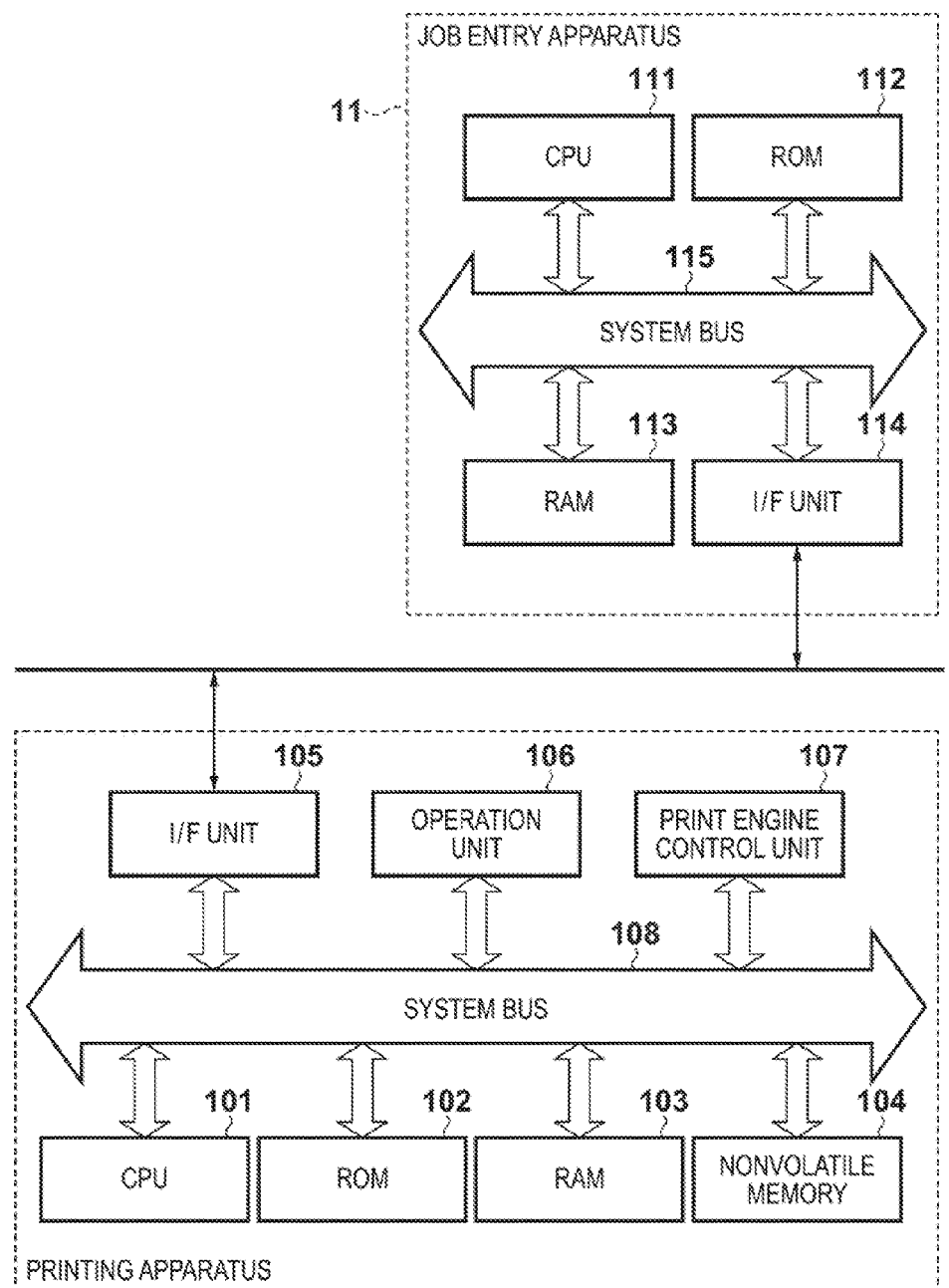
FIG. 1 is a block diagram showing the arrangements of a job entry apparatus and a printing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

FIG. 1 is a block diagram showing the arrangement of a job entry apparatus functioning as a job management apparatus and that of a printing apparatus functioning as a print control apparatus (or job processing apparatus) for processing a print job according to an embodiment of the present invention. A printing apparatus 10 is connected to a job entry apparatus 11 via an external network. Upon receiving a print instruction of an image, a document, a content, or the like from a PC, an information processing terminal device, a server, or the like (neither are shown) connected via the network, the job entry apparatus 11 starts print job state management processing with respect to the printing apparatus 10. In the printing apparatus 10, a CPU 101 is a central processing unit that controls the overall printing apparatus 10 in accordance with a control procedure program stored in a ROM 102. A RAM 103 is used as the work area of the CPU 101 and a memory area to store data received by an I/F unit 105. A nonvolatile memory 104 stores job identification information unique to each job included in an unprocessed job list and job result information such as normal termination and abnormal termination. The job identification information and the job result information are used to determine a job processing state upon powering on the printing apparatus 10. The I/F unit 105 receives an unprocessed job list or job data input from the job entry apparatus 11 connected to the printing apparatus and notifies the job entry apparatus 11 of a job processing state. An operation unit 106 includes a display unit and an input unit, and can display error termination of a job caused by power shutdown or the like and accept an unprocessed job list acquisition instruction from the user. A print engine control unit 107 includes printing mechanism portions configured to execute print processing, and corresponds to a printhead scan control unit or the like when the printing apparatus 10 is an inkjet printing apparatus. A system bus 108 communicably connects the components to each other.

In the job entry apparatus 11, a CPU 111 is a central processing unit that controls the overall job entry apparatus 11 in accordance with a control procedure program stored in a ROM 112. For example, the CPU 111 instructs to create and transmit an unprocessed job list, generate and transmit a job, and update a job processing state. A RAM 113 is used as the work area of the CPU 111 and a memory area to store data received by an I/F unit 114. The RAM 113 also holds the data of a generated job and the processing state and location of the job in association with each other. The I/F unit 114 receives a print instruction of an image, a document, a content, or the like from a PC, an information processing terminal device, or a server (neither are shown) connected via a network. The I/F unit 114 also transmits a job list or job data in response to a request from the printing apparatus 10. The printing apparatus 10 can notify a change in the job processing state, and the job entry apparatus 11 receives the notification from the printing apparatus 10. A system bus 115 communicably connects the components to each other.

In this embodiment, the printing apparatus 10 notifies the job entry apparatus 11 of the job processing state at the start and end of job printing. Hence, the job entry apparatus 11 can also manage the job processing state. In this embodiment, the job entry apparatus 11 manages four kinds of job processing states: "unprocessed", "under processing", "complete", and "error". When the processing state is "complete" or "error", the job entry apparatus 11 erases the corresponding job from the RAM 113. The printing apparatus 10 and the job entry apparatus 11 store the job processing state in a memory area in association with, for example, a job ID such that each of the above-described processing states can be identified as a flag.

FIG. 2 is a flowchart showing the procedure of print processing including job management according to this embodiment. Processing shown in FIG. 2 is executed by the CPU 101 in the printing apparatus 10 or by the CPU 111 in the job entry apparatus 11. Referring to FIG. 2, the printing apparatus 10 performs the processes of steps S201 to S211, and the job entry apparatus 11 performs the processes of steps S212 to S216.

The processing of the printing apparatus 10 shown in FIG. 2 may start upon receiving a notification representing addition of an unprocessed job list from the job entry apparatus 11. The processing may start when the printing apparatus 10 periodically inquires of the job entry apparatus 11 about job list acquisition. Alternatively, the processing may start when the input unit of the operation unit 106 has received an unprocessed job list acquisition instruction from the user. The unprocessed job list indicates a list of job identification information and real data locations (URLs or links) of jobs whose processing states are "unprocessed" out of jobs accumulated in the job entry apparatus 11.

In step S201, the printing apparatus requests an unprocessed job list. Upon receiving the request, the job entry apparatus 11 creates a table that associates the job identification information and real data locations of jobs whose job processing states are "unprocessed" in step S212, and transmits the unprocessed job list to the printing apparatus 10 in step S213. In step S202, the printing apparatus 10 acquires the unprocessed job list from the job entry apparatus 11. In step S203, the printing apparatus 10 determines whether at least one job exists in the job list.

Upon determining that at least one job exists in the list, the printing apparatus 10 requests the real data of the job from the job entry apparatus 11 in step S204. In response to the request, the job entry apparatus 11 transmits the real data of the designated job to the printing apparatus 10 in step S214. In step S205, the printing apparatus 10 acquires the real data of the job. When requesting and acquiring a job, the printing apparatus 10 may select one job to be printed from the job list acquired in step S202 and acquire the real data of the job by accessing its location. Alternatively, the printing apparatus 10 may notify the job entry apparatus 11 of the job identification information of the desired job and acquire the real data of the job corresponding to the notified job identification information as a response to the notification. The job whose real data has been acquired will be described as a job A for the sake of simplicity.

In step S206, after acquisition of the real data of the job A, the printing apparatus 10 stores the job identification information of the job A in the nonvolatile memory 104. In step S207, the printing apparatus 10 sends, to the job entry apparatus 11, a job processing state notification to notify that the processing state of the job has changed to "under processing" together with the job identification information of the job A. As a result, the job entry apparatus 11 is notified that print processing of the job A has started. In step S215, the job entry apparatus 11 receives the notification from the printing apparatus 10 and changes the processing state of the job A managed in the ROM 112 or the like from "unprocessed" to "under processing". In step S208, the printing apparatus 10 executes print processing based on the job A. In step S209, the printing apparatus 10 stores job result information in the nonvolatile memory 104 at the end of the print processing. The job result information is information representing whether the printing has normally terminated or abnormally terminated due to, for example, detection of an error or invalid data in the printing apparatus 10.

In step S210, the printing apparatus 10 sends, to the job entry apparatus 11, a job processing state notification to notify that the processing state of the job has changed to "complete" or "error" together with the job identification information of the job A. Which one of "complete" and "error" is to be notified can be decided based on the execution result of printing in step S208 or by referring to the job result information stored in the nonvolatile memory 104 in step S209. Note that when notifying the job entry apparatus 11 of "error", error cause information may be sent together. For example, paper jam in the printing apparatus 10 or the like is notified as the cause of the error. By the process of step S210, the job entry apparatus is notified of the end of printing of the job A.

In step S216, the job entry apparatus 11 changes the processing state of the job A managed in the ROM 112 from "under processing" to "complete" or "error". The job entry apparatus 11 can, for example, discard information about the job A by receiving the notification from the printing apparatus 10. In step S211, since the print processing of the job A is completed, the printing apparatus 10 erases the job identification information and job result information of the job A from the nonvolatile memory 104.

As described above, in this embodiment, the printing apparatus 10 records job identification information and job result information in the nonvolatile memory 104 and erases them from the nonvolatile memory 104. This arrangement allows the printing apparatus 10 to know the timing of power shutdown during the processing shown in FIG. 2 based on the contents stored in the nonvolatile memory 104. For example, if the job identification information remains in the nonvolatile memory 104 at the time of power-on of the printing apparatus 10, the printing apparatus can know that power shutdown has occurred during the print processing of the job. Additionally, when the job identification information is stored, the printing apparatus can reacquire the job A at the time of power-on, thereby performing reprinting. If the job result information remains in the nonvolatile memory 104 at the time of power-on, the printing apparatus can know that power shutdown has occurred during the time from the completion of print processing of the job to the end of job processing. That is, since the timing of power shutdown of the printing apparatus 10 can be known, the situation of job processing state notification to the job entry apparatus 11 at that time can also be known. Hence, the printing apparatus 10 sends an appropriate notification to the job entry apparatus 11 after the recovery from power shutdown, thereby ensuring job processing situation matching between the printing apparatus 10 and the job entry apparatus 11.

Job processing state determination will be described below with reference to FIG. 3, and processing performed by the printing apparatus 10 in correspondence with each determined state will be described with reference to FIGS. 4 to 6. FIG. 3 is a flowchart showing the procedure of job processing state determination processing performed by the CPU 101 when the printing apparatus 10 has recovered from power shutdown (at the time of power-on). When the printing apparatus 10 is powered on, in step S301, the CPU 101 determines whether job identification information is stored in the nonvolatile memory 104. Upon determining that no job identification information is stored, the CPU 101 determines that the printing apparatus 10 has been powered off before the job identification information storage process of step S206 or after the job identification information and job result information erase process of step S211. In this case, the CPU 101 ends the processing of FIG. 3 without determining the job processing state.

On the other hand, upon determining that job identification information is stored, the process advances to step S302, and the job processing state of the job A that was under processing at the time of power shutdown is determined in the subsequent processing. In step S302, the CPU 101 requests an unprocessed job list from the job entry apparatus 11. In step S303, the CPU 101 acquires the unprocessed job list. In step S304, the CPU 101 determines whether the job identification information of the job A stored in the nonvolatile memory 104 is included in the job list. If it is determined that the job identification information is included, the "unprocessed" state of the job A managed by the job entry apparatus 11 remains unchanged. That is, this reveals that the printing apparatus 10 has not sent the job processing state notification to the job entry apparatus 11 in step S207. Hence, the CPU 101 determines that the power shutdown has occurred during the time from the storage of the job identification information in the nonvolatile memory 104 to the job processing state notification of step S207 to change the job processing state to "under processing". This determination result will be referred to as "state 1" hereinafter.

Upon determining in step S304 that the job identification information of the job A stored in the nonvolatile memory 104 is not included in the acquired unprocessed job list, the CPU 101 determines in step S305 whether job result information is stored in the nonvolatile memory 104. Upon determining that no job result information is stored, the CPU 101 can determine that the power shutdown has occurred before the job result information storage process of step S209. Hence, the CPU 101 determines that the power shutdown has occurred during the time from the job processing state notification to change the job processing state to "under processing" to the storage of the job result information. This determination result will be referred to as "state 2" hereinafter. Upon determining in step S305 that the job result information is stored in the nonvolatile memory 104, the CPU 101 determines that the power shutdown has occurred during the time from the storage of the job result information in the nonvolatile memory 104 to the erase of the job identification information and job result information. This determination result will be referred to as "state 3" hereinafter.

FIG. 4 is a flowchart showing the procedure of processing corresponding to the determination result "state 1" in FIG. 3 at the time of recovery of the printing apparatus 10 from power shutdown. The processes shown in FIGS. 4 to 6 are executed by, for example, the CPU 101 of the printing apparatus 10. Upon determining "state 1", the printing apparatus 10 has been powered off while the job A remains unprocessed. Hence, the printing apparatus 10 reacquires the job A, thereby performing reprinting. In step S401, the CPU 101 reacquires the job A from the job entry apparatus 11. At this time, the CPU 101 may notify the job entry apparatus 11 of the job identification information of the job A stored in the nonvolatile memory 104 and acquire the real data of the job A as a response to the notification. In step S402, the CPU 101 erases the job identification information and job result information from the nonvolatile memory 104. In step S403, reprinting is performed based on the job A. As the reprinting method, steps S206 to S211 of FIG. 2 may be performed again. Note that in this embodiment, to newly store the job identification information and job result information at the time of reprinting, the process of step S402 is performed before the process of step S403. As described above, when the timing of power shutdown is determined as "state 1", the job is received and printed again at the time of recovery from the power shutdown.

FIG. 5 is a flowchart showing the procedure of processing corresponding to the determination result "state 2" in FIG. 3 at the time of recovery of the printing apparatus 10 from power shutdown. Referring to FIG. 5, when recovering from the power shutdown, a job processing state notification to change the processing state of the job to "error" is sent to the job entry apparatus 11, and an error notification for the user is performed. Upon determining "state 2", the printing apparatus 10 has been powered off during print processing of the job A. For this reason, the printing apparatus 10 notifies the job entry apparatus 11 and the user that the job A has error-terminated due to the power shutdown. This is because the job entry apparatus 11 cannot transit the processing state of the job A from "under processing" without this notification, and consequently, cannot discard information about the job A. Additionally, since the user of the printing apparatus 10 may also be unable to recognize completion of printing from the printed product at the time of recovery from power shutdown, a message representing the error termination needs to be displayed on the printing apparatus 10 as well. In step S501, the CPU 101 sends a job processing state notification to change the processing state of the job A to "error" to the job entry apparatus 11. In step S502, the CPU 101 performs display control to display the error termination of the job A on the display unit of the operation unit 106, thereby notifying the user of the printing apparatus 10 of the error. After that, in step S503, the CPU 101 erases the job identification information and job result information from the nonvolatile memory 104. Note that when notifying the job entry apparatus 11 of the error, error cause information representing that the error termination has occurred due to power shutdown may be sent together. As described above, when the timing of power shutdown is determined as "state 2", an error notification is sent to the job entry apparatus 11 and the user at the time of recovery from the power shutdown. This makes it possible to ensure matching of the managed job processing state between the printing apparatus 10 and the job entry apparatus 11.

Figure 6:
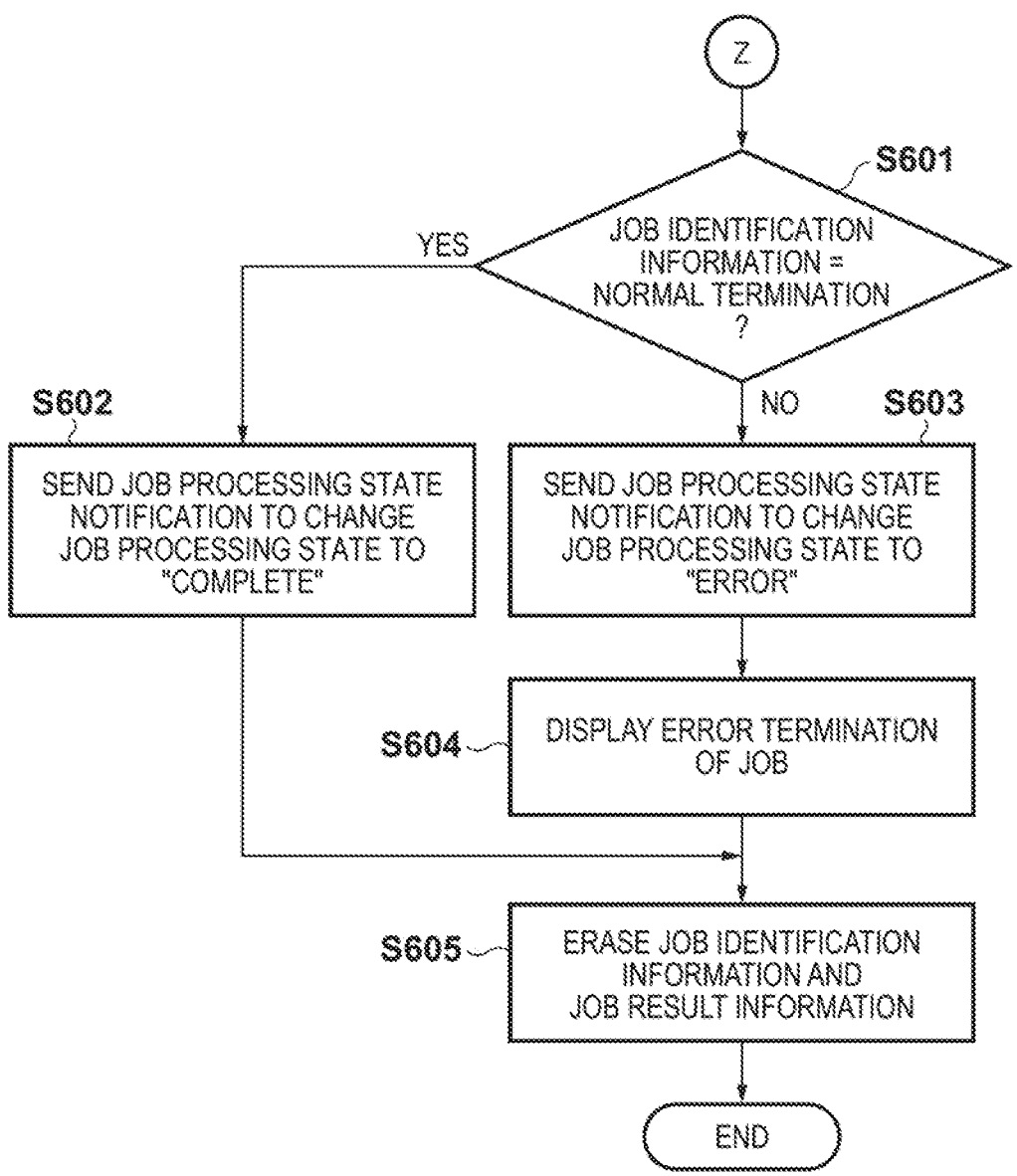
FIG. 6 is a flowchart showing the third job processing state management procedure.

FIG. 6 is a flowchart showing the procedure of processing corresponding to the determination result "state 3" in FIG. 3 at the time of recovery of the printing apparatus 10 from power shutdown. Referring to FIG. 6, when recovering from the power shutdown, a job processing state notification to change the processing state of the job to "error" or "complete" is sent to the job entry apparatus 11. When sending an "error" notification, the printing apparatus 10 also notifies the user of the error. Upon determining "state 3", power shutdown has occurred after completion of printing of the job A. In this embodiment, the job processing state notification is sent to the job entry apparatus 11 independently of whether the power shutdown has occurred before or after the job processing state notification of step S210 at the end of printing. This is because even if the power shutdown has occurred after the job processing state notification, matching with the job processing state managed by the job entry apparatus 11 can reliably be ensured by newly sending the job processing state notification to the job entry apparatus 11.

In step S601, the CPU 101 refers to the job result information stored in the nonvolatile memory 104 and determines whether the print processing has normally terminated. Upon determining that the print processing has normally terminated, the CPU 101 sends a job processing state notification to change the processing state of the job A to "complete" to the job entry apparatus 11 in step S602. On the other hand, upon determining that the print processing has not normally terminated, the CPU 101 sends a job processing state notification to change the processing state of the job A to "error" to the job entry apparatus 11 in step S603. After the process of step S603, in step S604, the CPU 101 displays the error termination of the job A on the operation unit 106, thereby notifying the user of the printing apparatus 10 of the error as well. After that, in step S605, the CPU 101 erases the job identification information and job result information from the nonvolatile memory 104. As described above, when the timing of power shutdown is determined as "state 3", a job processing state notification representing "complete" or "error" is sent to the job entry apparatus 11 at the time of recovery from the power shutdown. When sending a job processing state notification representing "error" to the job entry apparatus 11, the error is displayed for the user as well. This makes it possible to ensure matching of the managed job processing state between the printing apparatus 10 and the job entry apparatus 11. Note that out of the three processes described with reference to FIGS. 4 to 6, one or two processes may be performed.

Note that although the printing apparatus 10 notifies the job entry apparatus 11 of the job result information in the above-described example, the present invention is not limited to this. For example, the printing apparatus 10 may be connected to a network via a PC, and the PC may specify the processing result by the printing apparatus 10 and notify the job entry apparatus 11 of it. In this case, the PC functions as a print control apparatus. In the above-described example, the job entry apparatus 11 for entering a job to the printing apparatus 10 performs job processing state management as well. Instead, a management apparatus for managing a job state may be provided independently of the apparatus for entering a job, and job result information may be sent to the management apparatus.

In the above-described example, power shutdown has been exemplified as a (communication disable) state incapable of notifying job result information. However, the present invention is not limited to this, and the state may occur due to another cause such as a communication error. The job associated with the processing result notification may be a job other than a print job (for example, a job to perform predetermined processing for a designated image and save it in a predetermined memory). In this case, a job processing apparatus that has performed the job specifies the job processing result and transmits it to the job management apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154002, filed Jul. 9, 2012, which is hereby incorporated by reference herein in its entirety.

What is claimed is:
1. An apparatus comprising:
a processing unit configured to process a job;
a storage unit configured to store a processing result of a job which has been processed by said processing unit in a memory; and
a notification unit configured to notify a job management apparatus of the processing result stored in the memory by said storage unit;
wherein, in a case where the processing result of a first job has not been notified by said notification unit and has been stored in the memory when a state of the apparatus has transited from a first state incapable of communication with the job management apparatus to a second state capable of communication with the job management apparatus, said notification unit notifies the job management apparatus of the processing result of the first job which has been processed by said processing unit, and
wherein in a case where a second job is specified as a processing target by information stored in the job management apparatus and has not been processed yet by said processing unit when the state of the apparatus has transited from the first state to the second state, said processing unit processes the second job.
2. The apparatus according to claim 1, further comprising:
an acquisition unit configured to acquire, from the job management apparatus, the information to specify the second job as the processing target of the apparatus and whose processing state is not notified to the job management apparatus.

3. The apparatus according to claim 2, wherein said notification unit notifies the job management apparatus of a start of processing of the job and the processing result of the job as the processing state, and said acquisition unit acquires the information to specify the job which the start of the processing is not notified by said notification unit.

4. The apparatus according to claim 3, further comprising a determination unit configured to determine whether the job is the first job or the second job, based on whether the processing result of the job is stored in the memory by said storage unit.

5. The apparatus according to claim 1, wherein said processing unit requests the second job to the job management apparatus and processes the second job received from the job management apparatus in response to the request.

6. The apparatus according to claim 1, wherein the first state incapable of communication is power shutdown, and the second state capable of communication is a state in which the apparatus has been powered on in accordance with a user instruction.

7. The apparatus according to claim 1, wherein the memory comprises a nonvolatile memory.

8. The apparatus according to claim 1, wherein the job is a print job, and said notification unit notifies the job management apparatus of a result of printing by a printing apparatus.

9. The apparatus according to claim 8, wherein the print job including location information indicating a location where data to be printed is stored, and said processing unit causes the printing apparatus to print an image based on the data which is acquired according to the location information.

10. The apparatus according to claim 1, wherein said processing unit receives the job from the job management apparatus and processes the received job.

11. The apparatus according to claim 1, wherein the job which has been processed by said processing unit and whose processing result has not been notified by said notification unit, is not specified by the information stored in the job management apparatus, after said notification unit notifies the job management apparatus of the processing result of the job.

12. The apparatus according to claim 1, wherein said notification unit further notifies the job management apparatus of an error, in a case where the error occurs in processing of the job by said processing unit.

13. A job management method executed in an apparatus, the method comprising:
    processing a job;
    storing a processing result of a job which has been processed by said processing in a memory;
    notifying a job management apparatus of the processing result stored in the memory;
    notifying, in a case where the processing result of a first job has not been notified to a job management apparatus and has been stored in the memory when a state of the apparatus has transited from a first state incapable of communication with the job management apparatus to a second state capable of communication with the job management apparatus, the job management apparatus of the processing result of the first job which has been processed by said processing; and
    processing, in a case where a second job is specified as a processing target by information stored in the job management apparatus and has not been processed yet by said processing when the state of the apparatus has transited from the first state to the second state, the second job.

14. The method according to claim 13, further comprising:
    acquiring, from the job management apparatus, the information to specify the second job as the processing target of the apparatus and whose processing result is not notified to the job management apparatus.

15. The method according to claim 14, wherein in the notifying, the job management apparatus is notified of a start of processing of the job and the processing result of the job as the processing state, and in the acquiring, the information to specify the job which the start of the processing is not notified is acquired.

16. The method according to claim 15, further comprising determining whether the job is the first job or the second job, based on whether the processing result of the job is stored in the memory.

17. The method according to claim 13, wherein in the processing, the second job is requested to the job management apparatus, and the second job received from the job management apparatus in response to the request is processed.

18. The method according to claim 13, wherein the first state incapable of communication is power shutdown, and the second state capable of communication is a state in which the apparatus has been powered on in accordance with a user instruction.

19. The method according to claim 13, wherein the memory comprises a nonvolatile memory.

20. The method according to claim 13, wherein the job is a print job, and in the notifying, the job management apparatus is notified of a result of printing by a printing apparatus.

21. The method according to claim 20, wherein the print job including location information indicating a location where data to be printed is stored, and the printing apparatus is caused to print an image based on the data which is acquired according to the location information.

22. The method according to claim 13, wherein in the processing, the job is received from the job management apparatus, and the received job is processed.

23. The method according to claim 13, wherein the job which has been processed and whose processing result has not been notified, is not specified by the information stored in the job management apparatus, after the job management apparatus is notified of the processing result of the job.

24. The method according to claim 13, further comprising notifying the job management apparatus of an error, in a case where the error occurs in processing of the job.

25. A non-transitory computer-readable medium storing a program that causes a computer to function to:
    process a job;
    store a processing result of a job which has been processed in a memory;
    notify a job management apparatus of the processing result of the job;
    notify, in a case where the processing result of a first job has not been notified to a job management apparatus and has been stored in the memory when a state of the apparatus has transited from a first state incapable of communication with the job management apparatus to a second state capable of communication with the job management apparatus, the job management apparatus of the processing result of the first job which has been processed; and
    process, in a case where a second job is specified as a processing target by information stored in the job management apparatus and has not been processed yet when the state of the apparatus has transited from the first state to the second state, the second job.

* * * * *